(12) United States Patent
Revelino et al.

(10) Patent No.: US 11,338,719 B2
(45) Date of Patent: May 24, 2022

(54) SLIDE-OUT ROOM MECHANISM WITH CABLE DRIVE

(71) Applicant: LCI Italy s.r.l., Florence (IT)

(72) Inventors: Lawrence Revelino, Norco, CA (US); Rupert Wilkins, Norwich (GB); Fabio Romagnoli, Florence (IT)

(73) Assignee: LCI Italy s.r.l., Florence (IT)

( * ) Notice: Subject to any disclaimer, the term of this patent is extended or adjusted under 35 U.S.C. 154(b) by 523 days.

(21) Appl. No.: 16/528,840

(22) Filed: Aug. 1, 2019

(65) Prior Publication Data

US 2020/0369194 A1 Nov. 26, 2020

(30) Foreign Application Priority Data

May 20, 2019 (IT) ........................ 102019000007033

(51) Int. Cl.
*B60P 3/34* (2006.01)
*B66D 1/74* (2006.01)
*B62D 63/06* (2006.01)

(52) U.S. Cl.
CPC .............. *B60P 3/34* (2013.01); *B66D 1/7426* (2013.01); *B66D 1/7489* (2013.01); *B62D 63/061* (2013.01)

(58) Field of Classification Search
CPC ....... B60P 3/34; B62D 63/061; B66D 1/7426; B66D 1/7489
USPC ..... 296/26.13, 175, 171, 165, 176, 173, 170
See application file for complete search history.

(56) References Cited

U.S. PATENT DOCUMENTS

| | | | | |
|---|---|---|---|---|
| 1,972,415 A | * | 9/1934 | Anderson | B60P 3/34 296/172 |
| 2,902,312 A | * | 9/1959 | Ferrera | B60P 3/34 296/171 |
| 3,482,716 A | * | 12/1969 | Leadley | B60P 1/54 296/26.02 |
| 3,608,954 A | * | 9/1971 | Lynd | B60P 3/34 296/26.05 |
| 3,809,426 A | * | 5/1974 | Ratcliff | B60P 3/34 296/171 |
| 4,171,843 A | * | 10/1979 | Steury | B60P 3/34 296/156 |
| 4,270,791 A | * | 6/1981 | Tann | B62D 33/08 52/204.597 |
| 5,332,276 A | | 7/1994 | Blodgett, Jr. | |
| 5,951,096 A | * | 9/1999 | Steury | B60P 3/34 296/26.05 |

(Continued)

FOREIGN PATENT DOCUMENTS

| | | |
|---|---|---|
| CA | 2 488 352 | 5/2005 |
| WO | WO 2016/159769 | 10/2016 |

OTHER PUBLICATIONS

Extended European Search Report dated Apr. 30, 2020 issued in European Patent Application No. 19196247.1, 8 pp.

*Primary Examiner* — Gregory A Blankenship
(74) *Attorney, Agent, or Firm* — Nixon & Vanderhye P.C.

(57) ABSTRACT

A slide-out room system includes a motor-driven sheath with wound cables for extending and retracting the slide-out room. The cables and the sheath are configured such that rotation of the sheath in one direction displaces the cables to extend the room and such that rotation of the sheath in an opposite direction displaces the cables to retract the room.

16 Claims, 9 Drawing Sheets

(56) References Cited

U.S. PATENT DOCUMENTS

| | | | |
|---|---|---|---|
| 6,003,919 A * | 12/1999 | Shook | B60P 3/34 |
| | | | 296/26.14 |
| 6,108,983 A | 8/2000 | Dewald, Jr. et al. | |
| 7,234,747 B2 | 6/2007 | Rasmussen | |
| 7,374,218 B2 | 5/2008 | Schneider | |
| 7,461,480 B1 * | 12/2008 | Gardner | B60P 3/34 |
| | | | 52/79.5 |
| 7,588,279 B2 | 9/2009 | Rasmussen | |
| 8,016,343 B2 | 9/2011 | Schwindaman et al. | |
| 8,235,455 B2 | 8/2012 | Schwindaman et al. | |
| 8,240,744 B2 | 8/2012 | Schwindaman et al. | |
| 8,317,250 B2 | 11/2012 | Schwindaman et al. | |
| RE44,002 E | 2/2013 | Schwindaman et al. | |
| 8,573,666 B2 | 11/2013 | Schwindaman et al. | |
| 8,840,164 B2 | 9/2014 | Yoder et al. | |
| 8,925,990 B2 | 1/2015 | Yoder et al. | |
| 8,991,890 B2 | 3/2015 | Kreil | |
| 9,007,012 B2 | 4/2015 | Schwindaman et al. | |
| 9,193,291 B2 | 11/2015 | Schwindaman et al. | |
| 9,366,325 B2 | 6/2016 | Yoder et al. | |
| 9,545,870 B2 | 1/2017 | Walls | |
| 9,694,733 B2 | 7/2017 | Schwindaman et al. | |
| 2002/0089212 A1 * | 7/2002 | Garceau | B60P 3/34 |
| | | | 296/165 |
| 2008/0290689 A1 * | 11/2008 | Garceau | B60P 3/34 |
| | | | 296/175 |
| 2016/0288689 A1 * | 10/2016 | Rodabaugh | B60P 3/34 |
| 2017/0114877 A1 * | 4/2017 | Howie | F16H 19/0618 |
| 2019/0154121 A1 * | 5/2019 | Howie | F16H 19/0645 |
| 2020/0062164 A1 * | 2/2020 | Garceau | B60P 3/34 |

\* cited by examiner

SLIDE-OUT ROOM MECHANISM WITH CABLE DRIVE

CROSS-REFERENCES TO RELATED APPLICATIONS

This application claims the benefit of Italian Patent Application No. 102019000007033, filed May 20, 2019, the entire content of which is herein incorporated by reference.

STATEMENT REGARDING FEDERALLY SPONSORED RESEARCH OR DEVELOPMENT (Not Applicable)

BACKGROUND

The invention relates to a slide-out or retractable room for mobile living quarters, such as a recreational vehicle.

Recreational vehicles, such as motor homes, fifth-wheel trailers, and travel trailers may be provided with a retractable or slide-out room for increasing the living space of the vehicle. The retractable or slide-out room is extended for use when the vehicle is parked and is retracted into the main living area of the vehicle when the vehicle is in transit. Slide-out rooms typically require substantial space for mounting large electrical motors and hydraulic units that require the construction of expensive covers and thus reduce the overall space inside the vehicle.

Existing mechanisms for extending and retracting slide-out rooms utilize a drive screw that is designed to stay in tension. When improperly constructed, the screw can compress, which causes the screw to bow and contact the housing. Additionally, it is typical for the motor on the screw drive to move with the room, which also requires the wires to move.

Other problems with existing systems include undesirably exposed operating components when the room is expanded as well as inadequate sealing during transition between retracted and expanded positions.

BRIEF SUMMARY

It would thus be desirable for a slide-out room system that overcomes shortcomings of existing systems. In some embodiments, the drive system utilizes cables connected to drive bars on opposite side walls of the slide-out room. The cables are coupled to a rotatable sheath and threaded through respective drive blocks. Rotation of the sheath in one direction displaces the first and second cables to extend the slide-out room, and rotation of the sheath in an opposite direction displaces the first and second cables to retract the slide-out room.

BRIEF DESCRIPTION OF THE DRAWINGS

These and other aspects and advantages will be described in detail with reference to the accompanying drawings, in which.

DETAILED DESCRIPTION

Figure 1:
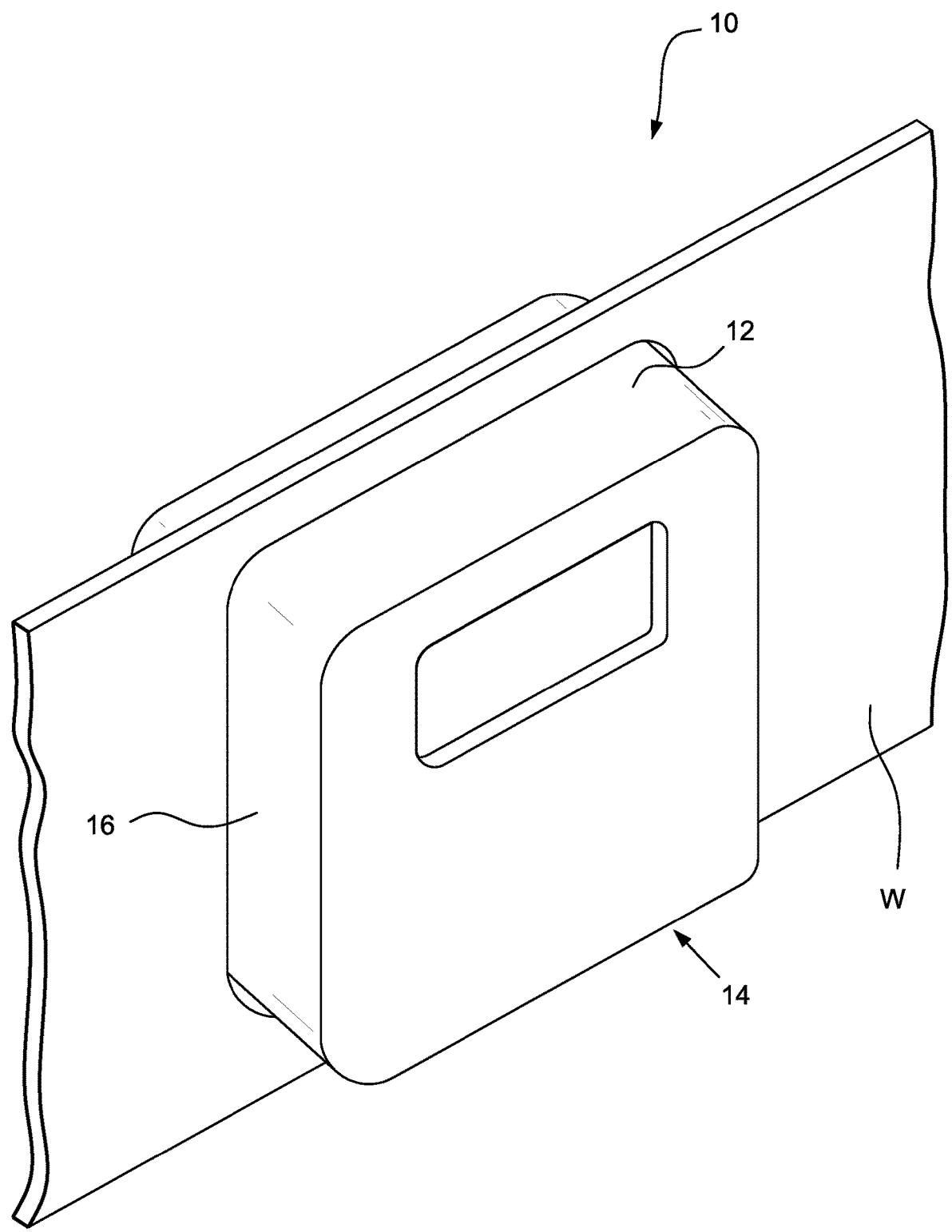
FIG. 1 is a perspective view of a slide-out room system for a vehicle.

FIG. 1 is a perspective view of a slide-out room system 10 for a vehicle. The system 10 includes a room defined by a top wall 12, a floor 14 and a pair of side walls 16 connected between the top wall 12 and the floor 14. First corner brackets 17a are provided at an intersection of each of the side walls 16 with the top wall 12, and second corner brackets 17b are provided at an intersection of each of the side walls 16 with the bottom wall 14 (see FIG. 5). As shown, the corner brackets 17a, 17b may be rounded. In FIG. 1, the slide-out room is shown in an extended or expanded position. The slide-out room extends through an opening in a wall W typically in the side of a vehicle. The view in FIG. 1 shows an exterior of the vehicle wall W.

Figure 2:
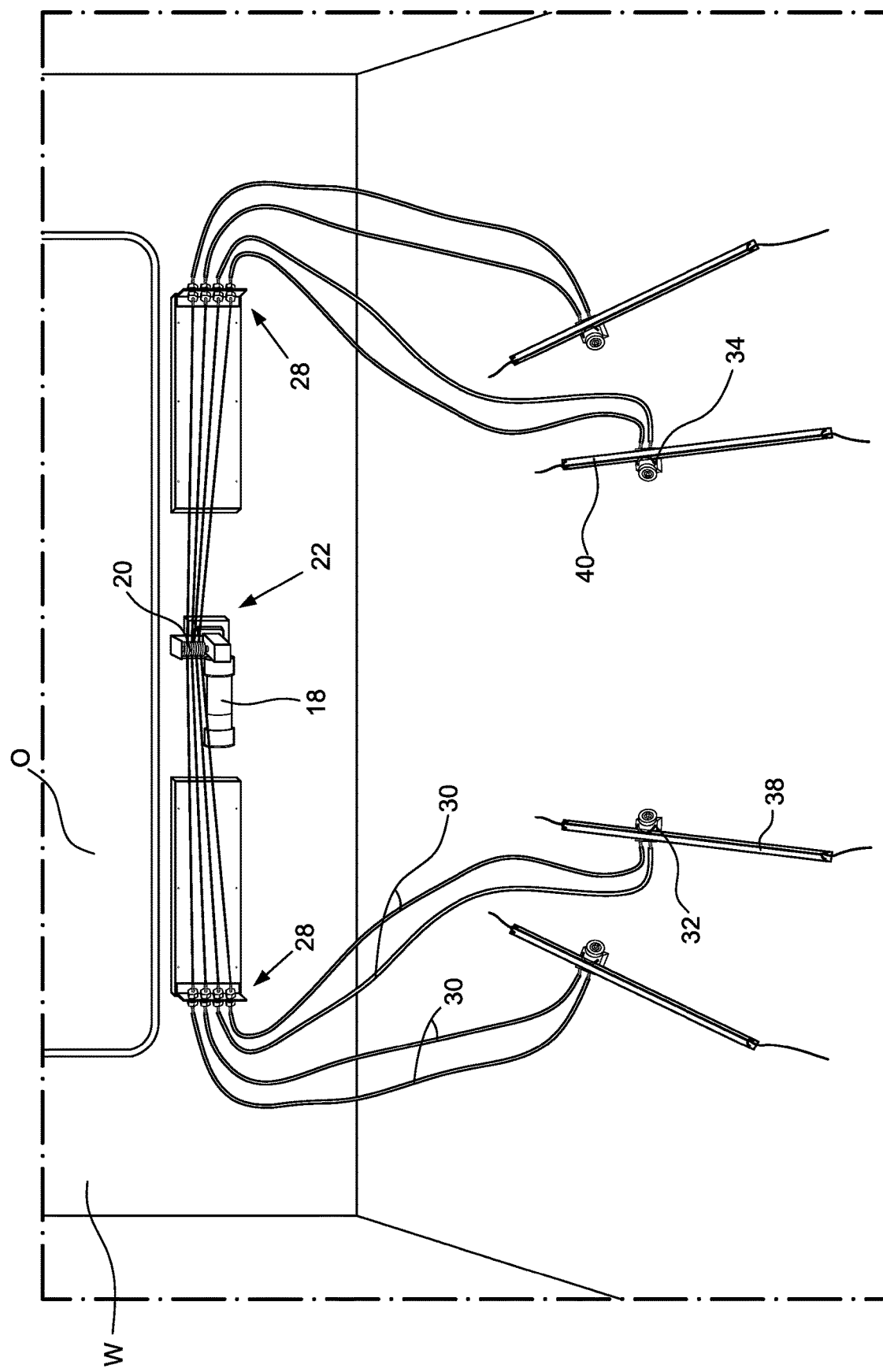
FIG. 2 shows the components of the drive mechanism.
Figure 3:
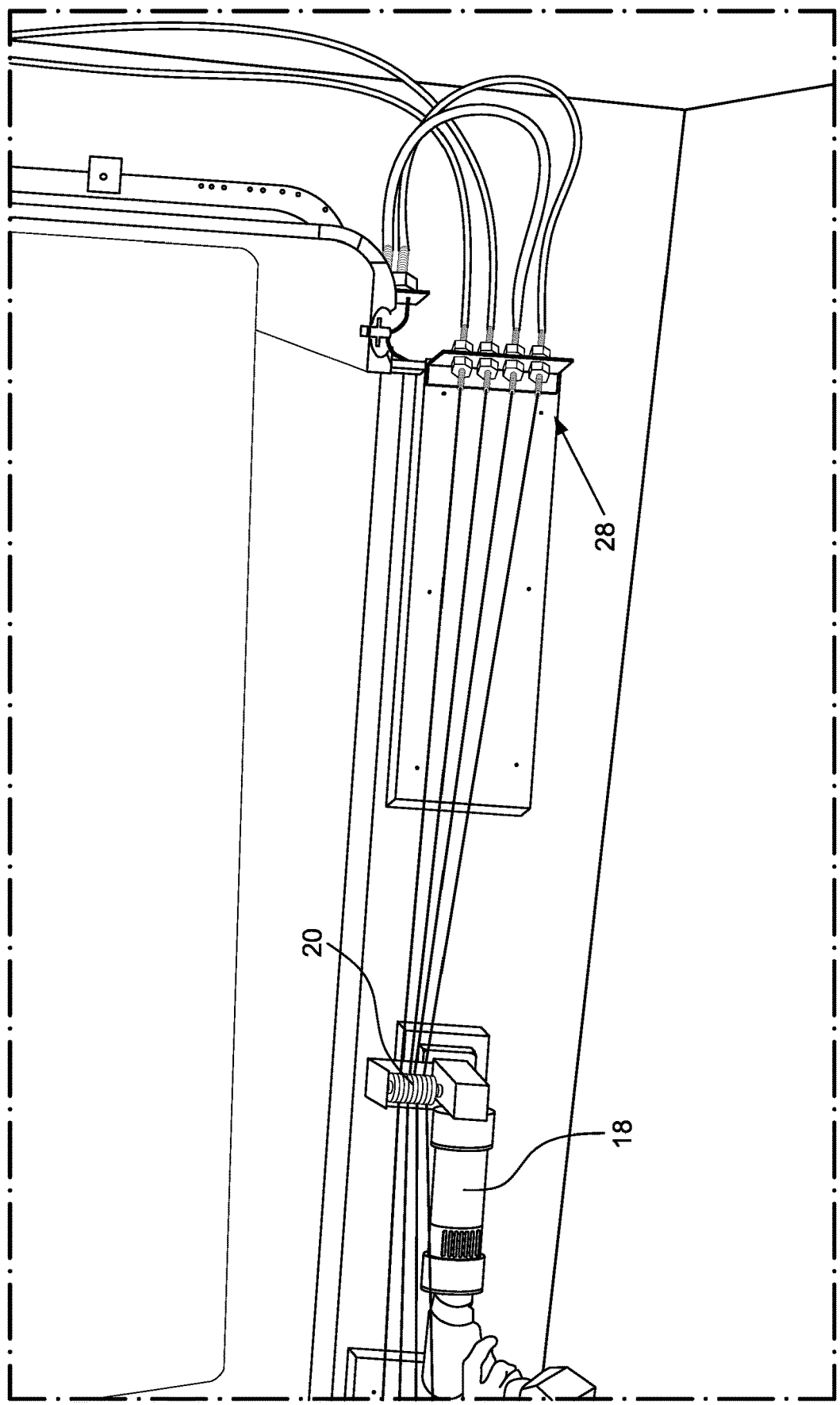
FIG. 3 is a close-up view of one side of the drive mechanism.
Figure 4:
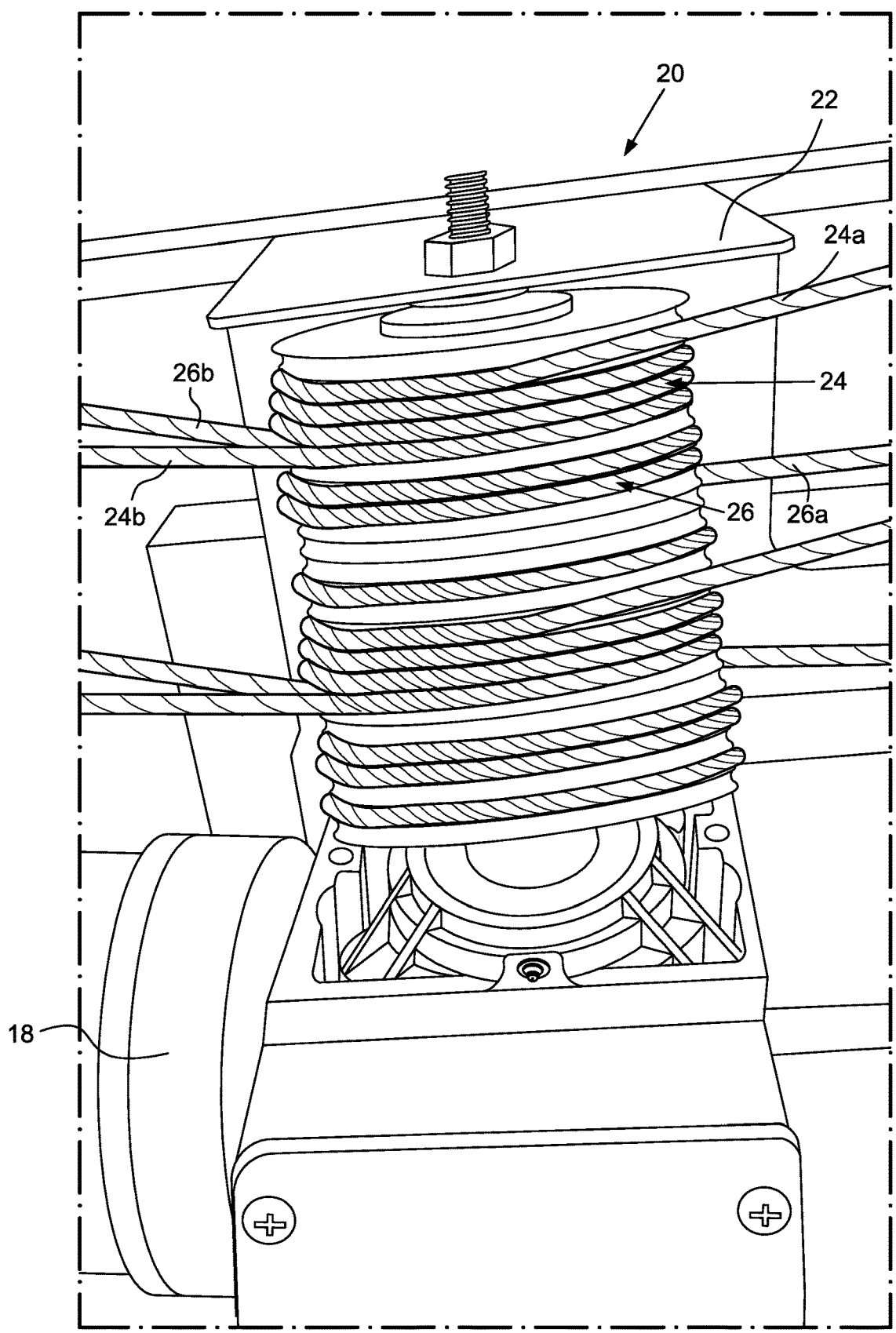
FIG. 4 shows a rotatable sheath with which the driving cables are engaged.

With reference to FIGS. 2-4, the drive mechanism is mounted on an interior side of the wall W adjacent an opening O in the wall W. As shown in FIGS. 2 and 3, in an exemplary construction, the drive mechanism may be mounted below the opening O.

The drive mechanism includes a motor 18 that is fixed to the wall W and immovable relative to the slide-out room. A cable winding drum or sheath 20 is coupled with the motor 18 for rotation by the motor 18. The motor and sheath are secured to the wall W via a motor assembly plate 22 or the like. The motor assembly plate 22 may be a single plate on which all of the components may be mounted. Additionally, the motor assembly plate 22 may be shortened depending on the application. A plurality of cables are positioned on the sheath 20 such that the sheath 20 displaces all the cables simultaneously in push and pull directions depending on a rotation direction of the sheath 20.

As discussed in more detail below, each cable extends from the sheath in a left side direction and a right side direction such that depending on the rotation direction of the sheath 20, one side of the cable is pulling the slide-out room (toward an extended or retracted position), while the other side of the same cable is following. For example, with reference to FIG. 4, a first cable 24 may include a right side room OUT end 24a and a left side room IN end 24b. In a similar context, a second cable 26 may include a right side room IN end 26a and a left side room OUT end 26b. The additional cables secured on the sheath 20 in FIG. 4 may be included as third and fourth cables similarly configured as the first and second cables 24, 26 as additional driving cables for the slide-out room. That is, where the first and second cables may drive left and right upper sides of the room, the third and fourth cables may identically and simultaneously drive left and right lower sides of the room.

Figure 9:
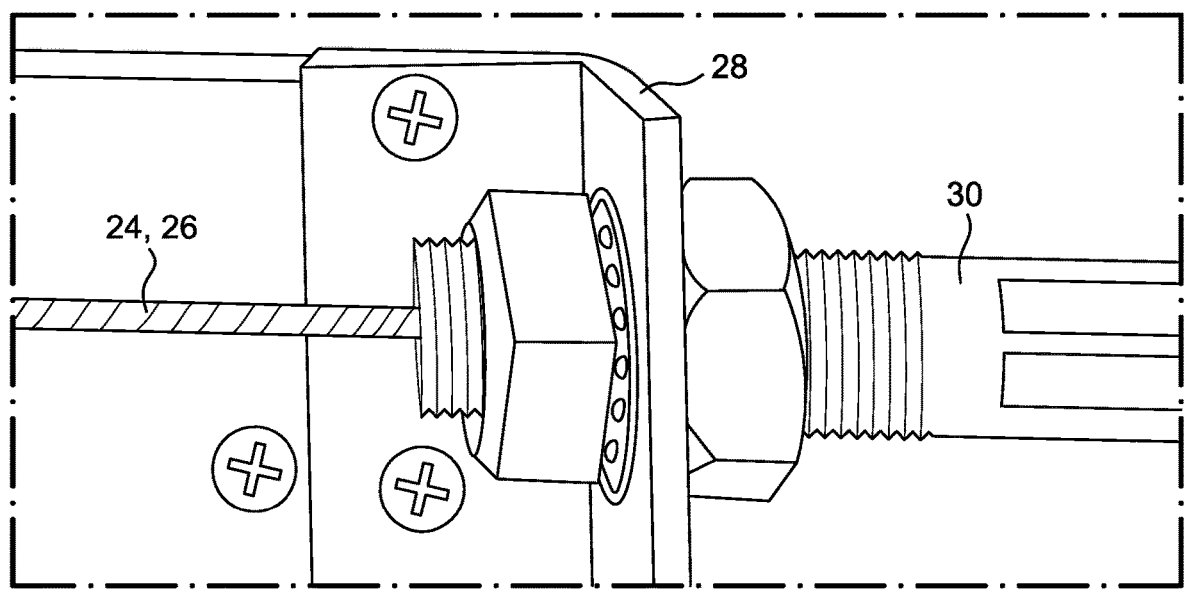
FIG. 9 shows a portion of the cables where the cable can be tensioned and adjusted.

The cable ends are extended in left and right directions (in FIG. 2) into end brackets 28 of the motor plate 22. A close-up view of an end bracket 28 is shown in FIG. 9. The end brackets 28 include openings for each of the cables, and the cables are extended into cable sleeves 30, such as Bowden cables.

Figure 6:
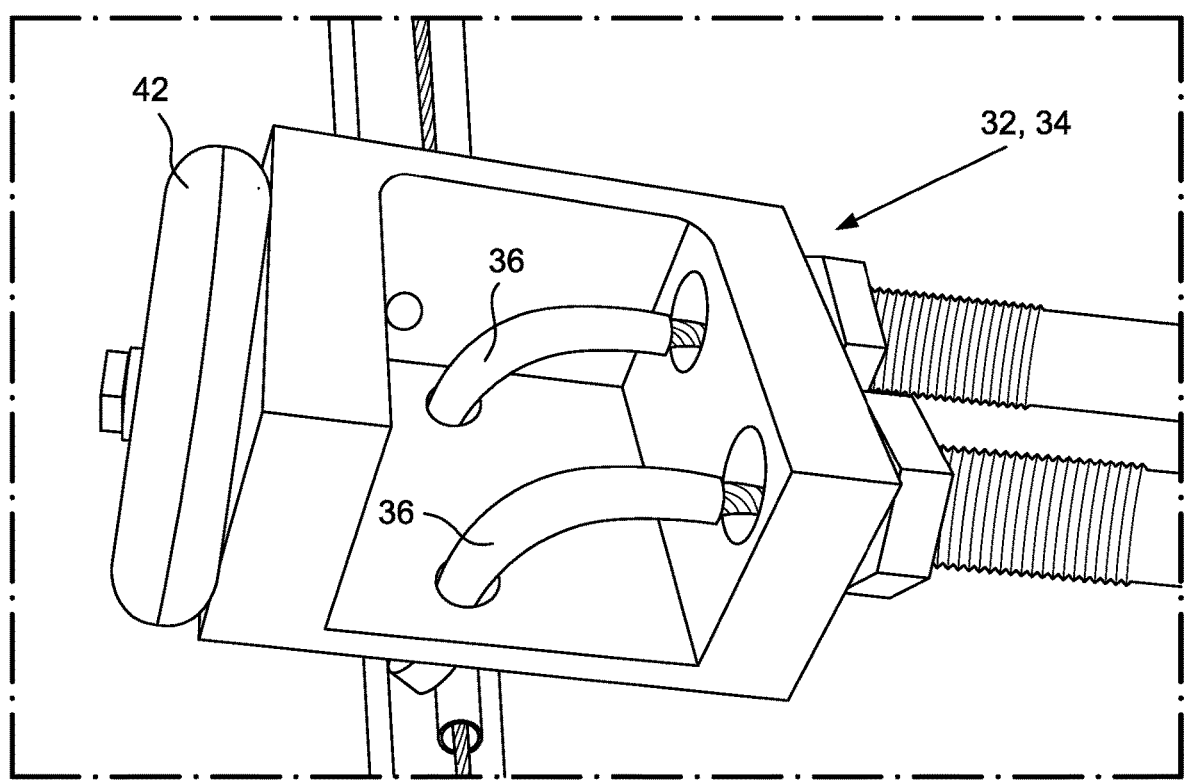
FIGS. 6 and 7 show the drive blocks that guide the cables to respective ends of the drive bars.
Figure 7:
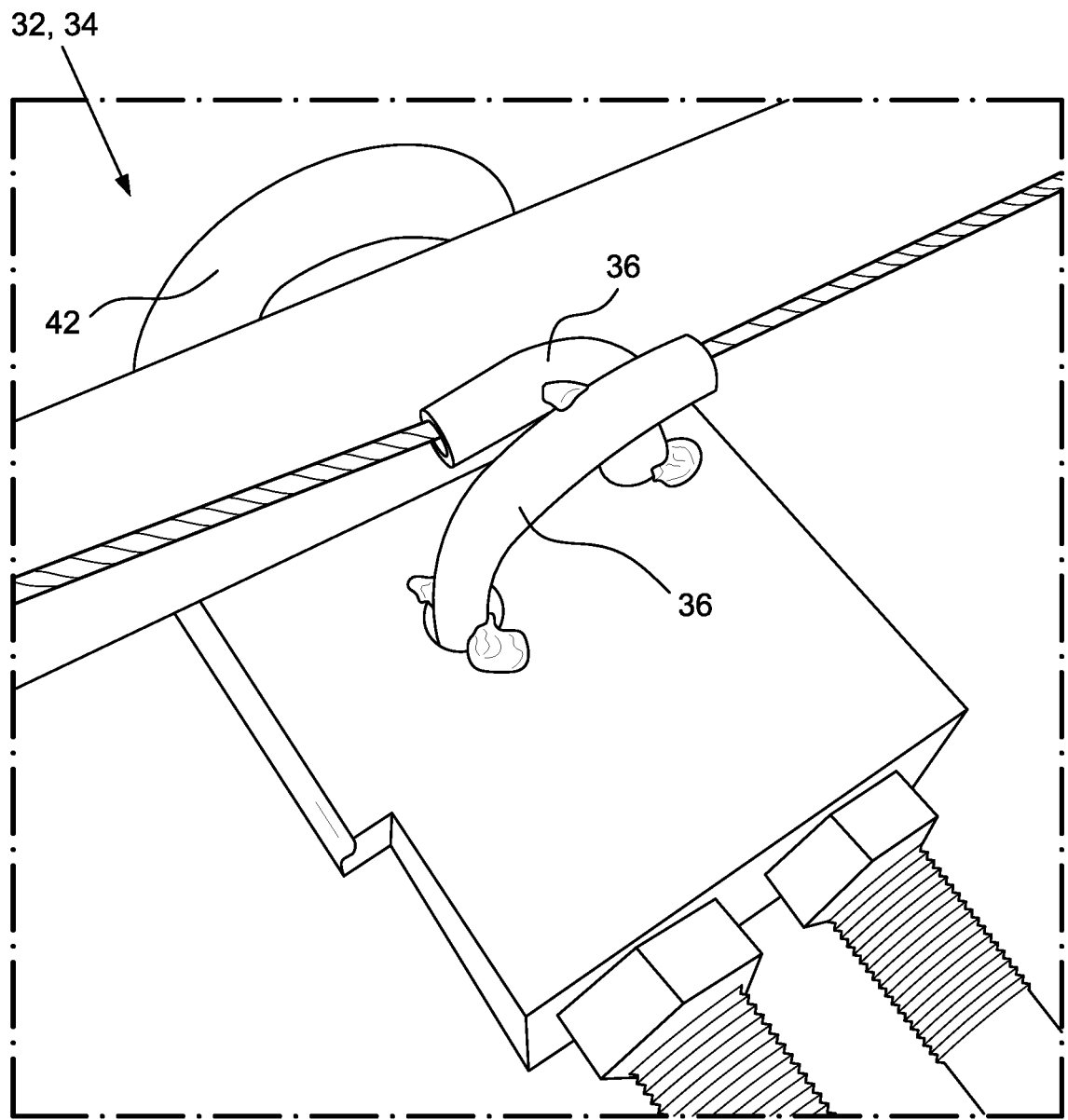

The cables extend through the cable sleeves 30 to respective drive blocks 32, 34. Each of the drive blocks 32, 34 receives an IN end of one cable and an OUT end of the other cable. For example, the first drive block 32 shown in FIG. 2 may receive the left side room IN end 24b of the first cable 24 and the left side room OUT end 26b of the second cable 26. Similarly, the second drive block 34 may receive the right side room OUT end 24a of the first cable 24 and the right side room IN end 26a of the second cable 26. As shown in FIGS. 6 and 7, each of the drive blocks 32, 34 includes a pair of diverters 36 that respectively divert the cable ends in opposite directions. As shown, in a preferred construction, the diverters 36 may be in the form of independent conduits that are bent to direct the cable ends in the opposite directions. The diverters 36 could be replaced by two pairs of pulley wheels to minimize friction.

The cable ends are secured to opposite ends of respective drive bars 38, 40. That is, the first drive block 32 directs the left side room IN end 24b of the first cable 24 and the left side room OUT end 26b of the second cable 26 toward opposite ends of the first drive bar 38 to which the respective ends are connected. Similarly, the second drive block 34 directs the right side room OUT end 24a of the first cable 24 and the right side room IN end 26a of the second cable 26 toward opposite ends of the second drive bar 40 to which the cable ends are secured.

Figure 5:
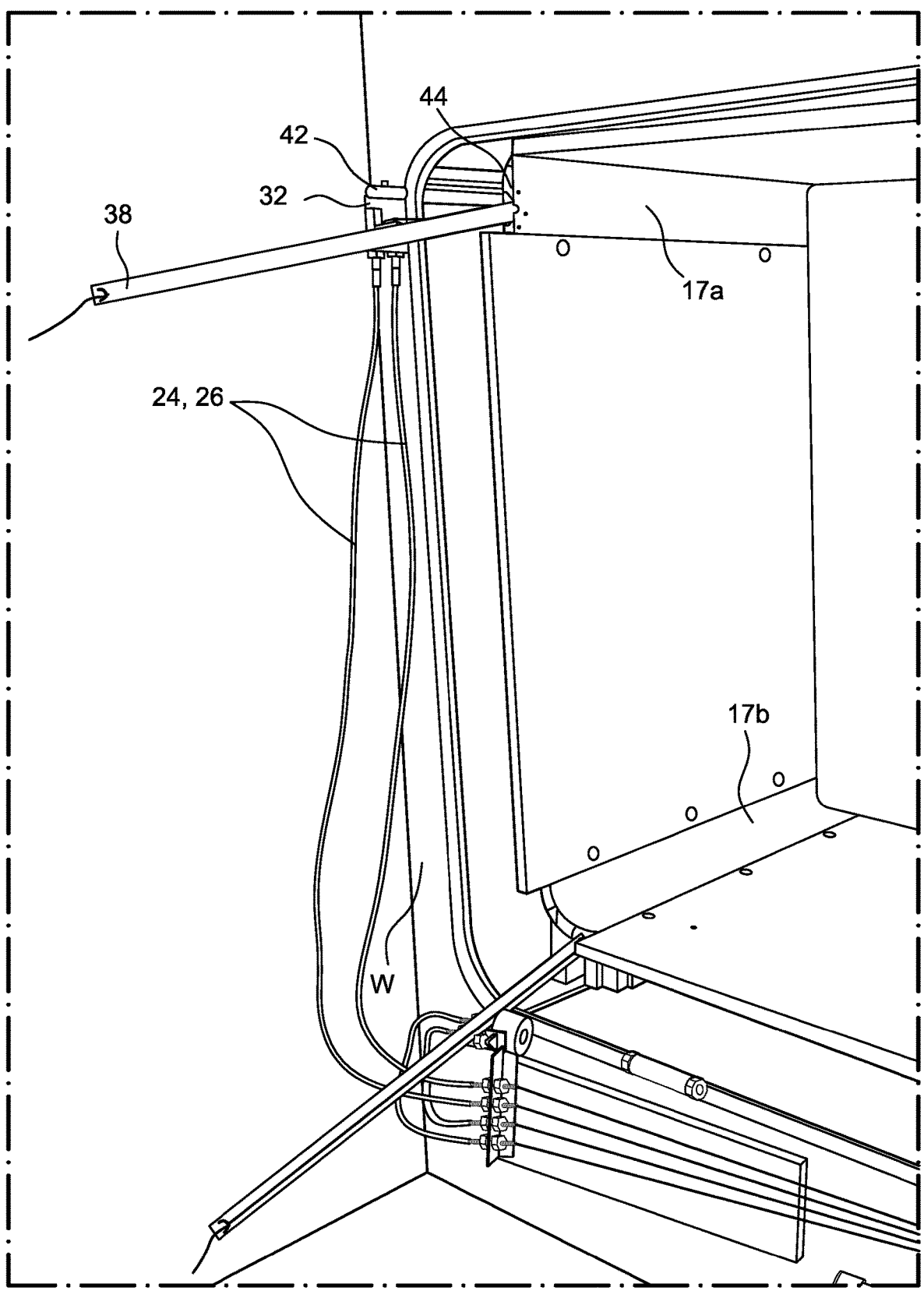
FIG. 5 is a perspective view of the slide-out room with the drive mechanism partially installed.

With reference to FIG. 5, the drive blocks 32, 34 (first drive block 32 shown in FIG. 5) are connected to the wall W and are thus positionally fixed relative to the slide-out room. As shown in FIGS. 6 and 7, a roller 42 is cooperable with each of the first and second drive blocks 32, 34 and is positioned to engage the side walls 16 of the slide-out room. The rollers 42 may be formed of polyurethane and may take the weight of the slide-out room and centralize the weight sideways.

Figure 8:
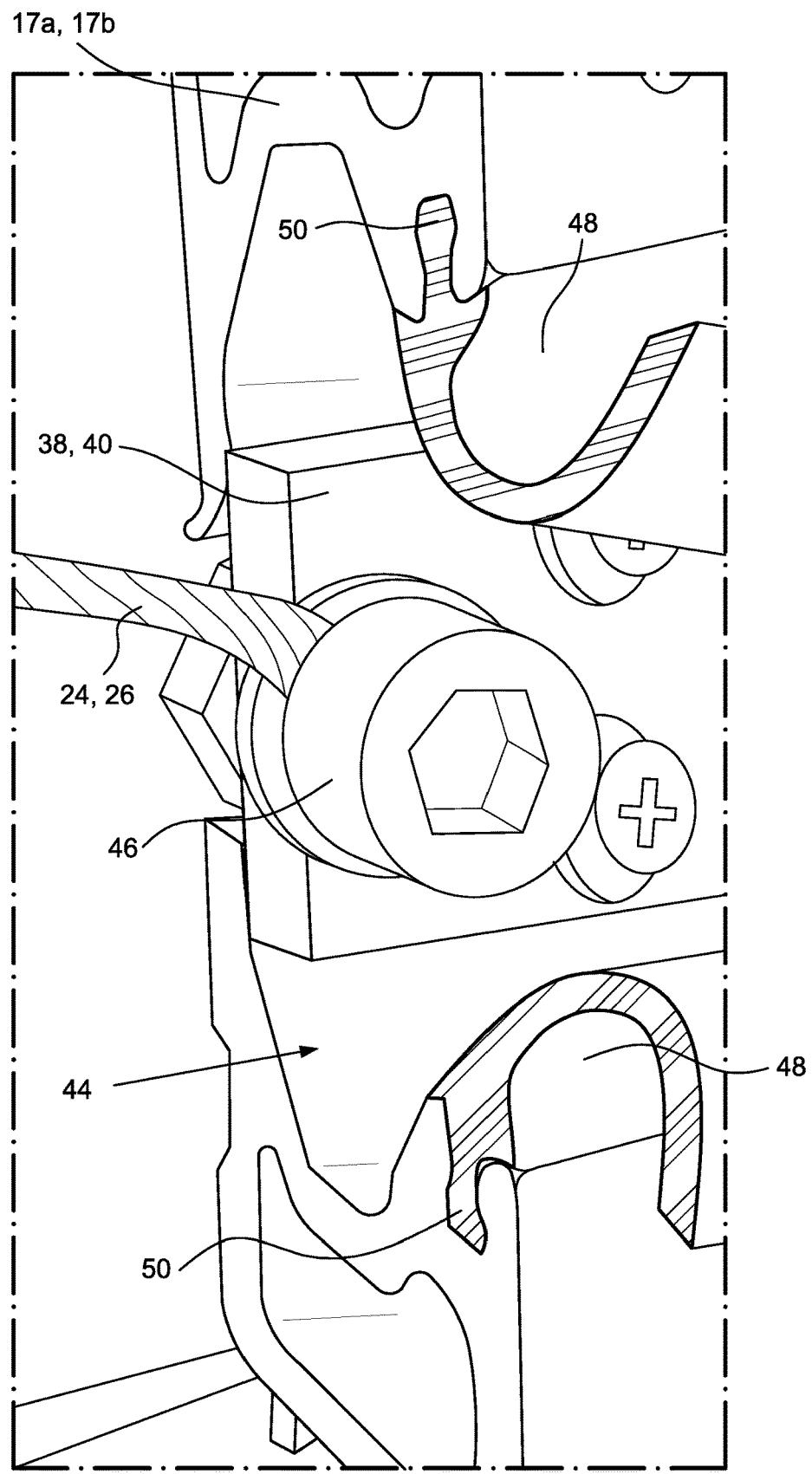
FIG. 8 shows a drive bar secured in a corner bracket channel.

The corner brackets 17a, 17b include a channel 44 that receives the drive bars 38, 40. The drive bars 38, 40 are fixed in the channels 44 via suitable connectors. A close-up view of the channel 44 is shown in FIG. 8. FIG. 8 shows one end of one of the cables 24, 26 secured to one of the drive bars 38, 40 via a suitable connector 46.

In order to conceal the drive bars 38, 40 and the cables 24, 26 in the channels 44, a cover member 48 may be secured in suitable cover channels 50 in each of the corner brackets 17a, 17b. In FIG. 8, the cover 48 is spread open to show the cable 24, 26 and the drive bar 38, 40. In use, the cover 48 conceals the cables 24, 26 and drive bars 38, 40 from view.

To assemble the drive mechanism, the motor 18 and sheath 20 are secured to the wall W adjacent the opening O. The cables 24, 26 are wound on the sheath 20 and directed through the end brackets 28 into the Bowden cables 30. The cables 24, 26 are positioned through their respective drive blocks 32, 34 and are secured to their respective drive bars 38, 40. After the slide-out room is fit in the opening O, the drive bars 38, 40 with connected cables are inserted into the channels 44 in each of the corner brackets and fixed with connectors at each end. The respective drive blocks 32, 34 are fixed to the wall W adjacent the opening O.

With reference to FIGS. 8 and 9, cable tensioning and adjustment may be conducted at the drive bars 38, 40 via the connector 46 as shown in FIG. 8. Alternatively, tensioning and adjustment may be made at ends of the Bowden cables 30 by adjusting the nuts as shown in FIG. 9. Spring tensioners may be built into the system.

With each of the drive bars 38, 40 secured in the corner brackets 17a, 17b and the drive blocks 32, 34 positioned on the wall W, rotation of the sheath 20 in one direction displaces the first and second cables 24, 26 to extend the slide-out room, and rotation of the sheath in an opposite direction displaces the first and second cables 24, 26 to retract the slide-out room.

A narrow frame member may be secured in the opening in the vehicle wall W, and a seal member such as a V-shaped seal or "V seal" may be positioned between the narrow frame and the slide-out room. Since the frame and seal are fixed in the vehicle opening, the slide-out room is displaceable relative to the seal, and the slide-out room remains sealed in the retracted position, the extended position and while transitioning between the retracted and extended positions.

The cable drive mechanism eliminates problems with existing systems utilizing a drive screw. Another advantage is the use of a single motor rather than two or four motors. Moreover, the motor is fixed relative to the slide-out room and thus does not move with the slide-out room, resulting in a simplified and more reliable assembly. The single motor also facilitates manual control of the sheath if necessary due to motor disconnect or malfunction.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A drive mechanism for a slide-out room, the drive mechanism comprising:
   a motor;
   a sheath coupled with the motor for rotation by the motor;
   a first cable engaging the sheath, the first cable including a right side room OUT end and a left side room IN end;
   a second cable engaging the sheath, the second cable including a right side room IN end and a left side room OUT end;
   a first drive block fixable relative to the slide-out room, the first drive block receiving the left side room IN end of the first cable and the left side room OUT end of the second cable;
   a second drive block fixable relative to the slide-out room, the second drive block receiving the right side room OUT end of the first cable and the right side room IN end of the second cable;
   a first drive bar securable to a sidewall of the slide-out room adjacent the first drive block, wherein the left side room IN end of the first cable and the left side room OUT end of the second cable are connected at opposite ends of the first drive bar; and
   a second drive bar securable to a sidewall of the slide-out room adjacent the second drive block, wherein the right side room OUT end of the first cable and the right side room IN end of the second cable are connected at opposite ends of the second drive bar.

2. A drive mechanism according to claim 1, wherein at least portions of the first cable and the second cable are disposed within cable sleeves.

3. A drive mechanism according to claim 1, wherein the first drive block comprises a pair of first diverters that respectively divert the left side room IN end of the first cable toward one end of the first drive bar and the left side room OUT end of the second cable toward an opposite end of the first drive bar, and wherein the second drive block comprises a pair of second diverters that respectively divert the right side room OUT end of the first cable toward one end of the second drive bar and the right side room IN end of the second cable toward an opposite end of the second drive bar.

4. A drive mechanism according to claim 3, wherein the first and second diverters comprise independent conduits.

5. A drive mechanism according to claim 4, wherein the independent conduits are bent.

6. A drive mechanism according to claim 1, further comprising a roller cooperable with each of the first and second drive blocks, the rollers being positioned to engage the sidewalls of the slide-out room.

7. A drive mechanism according to claim 1, wherein the first cable comprises a first upper cable and a first lower cable, wherein the second cable comprises a second upper cable and a second lower cable, wherein the first drive block comprises a first upper drive block and a first lower drive block, wherein the second drive block comprises a second upper drive block and a second lower drive block, wherein the first drive bar comprises a first upper drive bar and a first lower drive bar, and wherein the second drive bar comprises a second upper drive bar and a second lower drive bar.

8. A drive mechanism according to claim 1, wherein the first and second cables and the sheath are configured such that rotation of the sheath in one direction displaces the first and second cables to extend the slide-out room and such that rotation of the sheath in an opposite direction displaces the first and second cables to retract the slide-out room.

9. A slide-out room system for a vehicle, the slide-out room system comprising:
   a room defined by a top wall, a floor, and a pair of sidewalls connected between the top wall and the floor;
   a first drive bar secured to one of the pair of sidewalls;
   a second drive bar secured to the other of the pair of sidewalls a rotatable sheath;
   a first cable engaging the sheath, one end of the first cable being secured to the first drive bar through a first drive block, and an opposite end of the first cable being secured to the second drive bar through a second drive block; and
   a second cable engaging the sheath, one end of the second cable being secured to the first drive bar through the first drive block, and an opposite end of the second cable being secured to the second drive bar through the second drive block.

10. A slide-out room system according to claim 9, further comprising a motor fixed relative to the room and coupled with the sheath for rotating the sheath.

11. A slide-out room system according to claim 10, wherein the first and second cables and the sheath are configured such that rotation of the sheath in one direction displaces the first and second cables to extend the room and such that rotation of the sheath in an opposite direction displaces the first and second cables to retract the room.

12. A slide-out room system according to claim 9, wherein the room includes first corner brackets at an intersection of each of the sidewalls with the top wall and second corner brackets at an intersection of each of the sidewalls with the bottom wall, at least the first corner brackets comprising a channel respectively housing the first and second drive bars.

13. A slide-out room system according to claim 12, wherein a cover is secured in each of the first corner brackets adjacent the first and second drive bars.

14. A slide-out room system according to claim 12, wherein the first corner brackets and the second corner brackets are rounded.

15. A slide-out room system according to claim 9, wherein at least portions of the first cable and the second cable are disposed within cable sleeves.

16. A slide-out room system according to claim 9, wherein the first drive block comprises a pair of first diverters that respectively divert the one ends of the first and second cables toward respective ends of the first drive bar, and wherein the second drive block comprises a pair of second diverters that respectively divert the opposite ends of the first and second cables toward respective ends of the second drive bar.

* * * * *